United States Patent
Jeon et al.

(10) Patent No.: US 7,558,231 B2
(45) Date of Patent: Jul. 7, 2009

(54) POWER ALLOCATION METHOD AND APPARATUS FOR PROVIDING PACKET DATA SERVICE IN MOBILE COMMUNICATION SYSTEM

(75) Inventors: Wha Sook Jeon, Seoul (KR); Dong Geun Jeong, #102-506 Garak 6cha Hyundai Apt., Garakbon-dong, Songna-gu, Seoul (KR) 138-169; Won Suk Chung, Seoul (KR); Yong Gil Park, Gyeonggi-do (KR); Chul Park, Gyconggi-do (KR); Kang Il Koh, Gyconggi-do (KR)

(73) Assignees: SK Telecom Co., Ltd., Seoul (KR); Dong Geun Jeong, Seoul (KR)

( * ) Notice: Subject to any disclaimer, the term of this patent is extended or adjusted under 35 U.S.C. 154(b) by 751 days.

(21) Appl. No.: 10/758,028

(22) Filed: Jan. 14, 2004

(65) Prior Publication Data

US 2004/0253928 A1    Dec. 16, 2004

(30) Foreign Application Priority Data

Jun. 12, 2003   (KR)   ...................... 10-2003-0038063

(51) Int. Cl.
*H04B 7/185*  (2006.01)
(52) U.S. Cl. ...................................... 370/318; 455/522
(58) Field of Classification Search .................. 370/318
See application file for complete search history.

(56) References Cited

U.S. PATENT DOCUMENTS 5,175,867 A  *  12/1992  Wejke et al. ................ 455/439

(Continued)

OTHER PUBLICATIONS

Lay Teen Ong and Sangarapillai Lambotharan, "Variable Rate Variable Power Mimo System for Integrated Voice and Data Services", Oct. 2006, IEEE, 10th IEEE Singapore International Conference on Communication systems, 2006. ICCS 2006, pp. 1-5.*

Insoo Koo, Jeongrok Yang, Yeongyoon Choi and Kiseon Kim, "Capacity-Optimized Power Allocation Scheme in an Integrated Voice and Data DS-CDMA System", Sep. 15, 1999, IEEE, TENCON 99. Proceedings of the IEEE Region 10 Conference, pp. 1178-1181 vol. 2.*

(Continued)

*Primary Examiner*—Hassan Kizou
*Assistant Examiner*—Hooman Houshmand
(74) *Attorney, Agent, or Firm*—Lowe Hauptman Ham & Berner, LLP

(57) ABSTRACT

Provided is a power allocation method and apparatus for providing a packet data service in a mobile communication system is capable of reducing outage of a line service while simultaneously providing the line service and the packet service. It is checked whether or not packet data traffic to be transmitted to a specified mobile station is newly generated. If the packet data traffic is newly generated, it is checked whether or not there is the mobile station making use of the line service where a current call is in progress. If there is the mobile station making use of the line service where the current call is in progress, it is checked whether or not the packet data traffic is currently transmitted to any other mobile station. If the packet data traffic is not currently transmitted to the other mobile station, the power transmitted to the mobile station making use of a new packet data service is gradually increased by a preset increment for a preset predetermined time. Thereby, it is possible to innovatively reduce the outage of the mobile station making use of the line service while simultaneously providing the line service and the packet service as compared with the prior art.

22 Claims, 8 Drawing Sheets

U.S. PATENT DOCUMENTS

| | | | | |
|---|---|---|---|---|
| 5,745,523 A * | 4/1998 | Dent et al. | ............ | 375/216 |
| 5,982,760 A * | 11/1999 | Chen | ............ | 370/335 |
| 6,374,117 B1 * | 4/2002 | Denkert et al. | ............ | 455/522 |
| 6,950,669 B2 * | 9/2005 | Simonsson | ............ | 455/522 |
| 7,209,724 B2 * | 4/2007 | Richards et al. | ............ | 455/266 |

OTHER PUBLICATIONS

Qiang Shen, "Power Assignment in CDMA Personal Communication Systems With Integrated Voice/Data Traffic", Nov. 18, 1996, IEEE, Global Telecommunications Conference, 1996. GLOBECOM '96, pp. 168-172.*

* cited by examiner

POWER ALLOCATION METHOD AND APPARATUS FOR PROVIDING PACKET DATA SERVICE IN MOBILE COMMUNICATION SYSTEM

BACKGROUND OF THE INVENTION

1. Field of the Invention

The present invention relates to a power allocation method and apparatus for providing a packet data service in a mobile communication system.

2. Description of the Related Art

There are third generation mobile communication systems, such as HSDPA (High Speed Downlink Packet Access) of 3GPP ($3^{rd}$ Generation Partnership Project) and 1×EV-DV (1× Evolution for Data and Voice) of 3GPP2 ($3^{rd}$ Generation Partnership Project 2), which provide a voice service and a high-speed packet data service in a mobile communication system at the same time.

The above-mentioned two systems provide a line service and a packet data service within the same frequency allocation (FA). Since the line service has different characteristics from the packet data service, there occurs the following problem in providing two different services within the same FA.

The line service generally refers to a real-time service, such as a voice service, a video service or so on, which is very sensitive to a delay. To lower transmission errors without the delay, this line service performs transmission power control on the transmission side (at the base transceiver station) so that reception power is to be maintained at a constant level.

By contrast, the packet data service refers to a non-real-time service, such as Internet access, file transmission etc., which is not as sensitive to the delay as the line service. Therefore, the packet data service controls transmission speed in order to increase data throughout in spite of delays.

The foregoing systems share resources of the base transceiver station, the transmission side, in order to provide the line and packet data services within the same FA. As a representative example, power of the base transceiver station is shared during provision of the line and packet data services.

During the power control for the line service as well as speed control for the packet data service, the total power which the base transceiver station is capable of supplying is shared. In other words, the base transceiver station allocates all the remaining power other than the power needed to provide the line service in order to provide the packet data service.

FIG. 1 is a graph explaining power allocation in a conventional mobile communication system.

Referring to FIG. 1, in the case where a base transceiver station has available peak power as indicated by $P_{FULL}$ and is in operation with a certain amount of power, $\Delta P1$, allocated to a mobile station for the line service at a certain time, t1, when any mobile station begins to get the packet data service, namely, there is generated new packet data traffic, the power corresponding to $\Delta P2$ is allocated to the mobile station making use of the packet data service.

To be more specific, when the new packet data traffic intended for transmission is generated, the conventional systems transmit the packet data traffic in such a manner that the power, $\Delta P1$, of the base transceiver station is preferentially allocated to the line service, and then all the power, $\Delta P2$, remaining after allocation to the line service is allocated to the new mobile station, which makes use of the packet data service.

As a result, the power, $\Delta P2$, allocated to the mobile station making use of the packet data service forces mobile stations, which make use of the line service while the constant power control is currently performed, to incur tremendous increase in noise.

That is to say, this is responsible for allocating all the power remaining after the line service is provided to the mobile stations making use of the packet data service at once, and thus interference to which the mobile stations making use of the line service are subjected is to be increased tremendously. Of course, the base transceiver station copes with the tremendously increased interference by means of the power control for guaranteeing the quality of the line service. However, because it takes transmission power some time to reach a new equilibrium point by means of this power control, the line service is subjected to outage for that time. Consequently, this leads to a problem in that the quality of the line service deteriorates.

Particularly, the higher a ratio of using the wireless data as in a wireless application protocol (WAP) or a hypertext transfer protocol (HTTP) becomes, the more frequently such a problem is generated. Thus, there is a drawback in that performance of the system is greatly decreased.

SUMMARY OF THE INVENTION

To solve the above-indicated problems, it is, therefore, an object of the present invention to provide a power allocation method and apparatus for providing a packet data service in a mobile communication system, capable of reducing line outage service while simultaneously providing the line service and the packet data service in the same frequency allocation.

To achieve the above object, according one aspect of the present invention, there is a power allocation method for providing a packet data service in a mobile communication system, the method comprising the steps of: (a) checking whether or not packet data traffic to be transmitted is newly generated; (b) if it is checked and the packet data traffic to be transmitted is newly generated in the step (a), checking whether or not there is a mobile station making use of a line service where a current call is in progress; (c) if it is checked and there is the mobile station making use of the line service where the current call is in progress, checking whether or not the packet data traffic is currently transmitted to any other mobile station; and (d) if it is checked and the packet data traffic is not currently transmitted to the other mobile station, allocating power by gradually increasing power transmitted to the mobile station making use of a new packet data service by a preset increment for a preset predetermined time.

Another aspect of the present invention provides a power allocation apparatus for providing a packet data service in a mobile communication system. The power allocation apparatus comprises a base transceiver station of a mobile communication network and a control section. The base transceiver station includes an antenna for performing wireless communication with a mobile station; a transmission section for performing wireless transmission by means of the antenna; a reception section for performing wireless reception by means of the antenna; a data reception section for receiving data to be transmitted from the mobile communication network to the mobile station; a data processing section for processing the data received through the data reception section in accordance with a predetermined algorithm; a modulation section for modulating the data processed by the data processing section; and a power section for supplying/driving power to allow the data modulated by the modulation section to be transmitted through the antenna. The control section checks whether or not there is the mobile station making use of the packet data service, and according to the checked result, controlling the power section to gradually increase the power transmitted to the mobile station making use of the packet data service.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
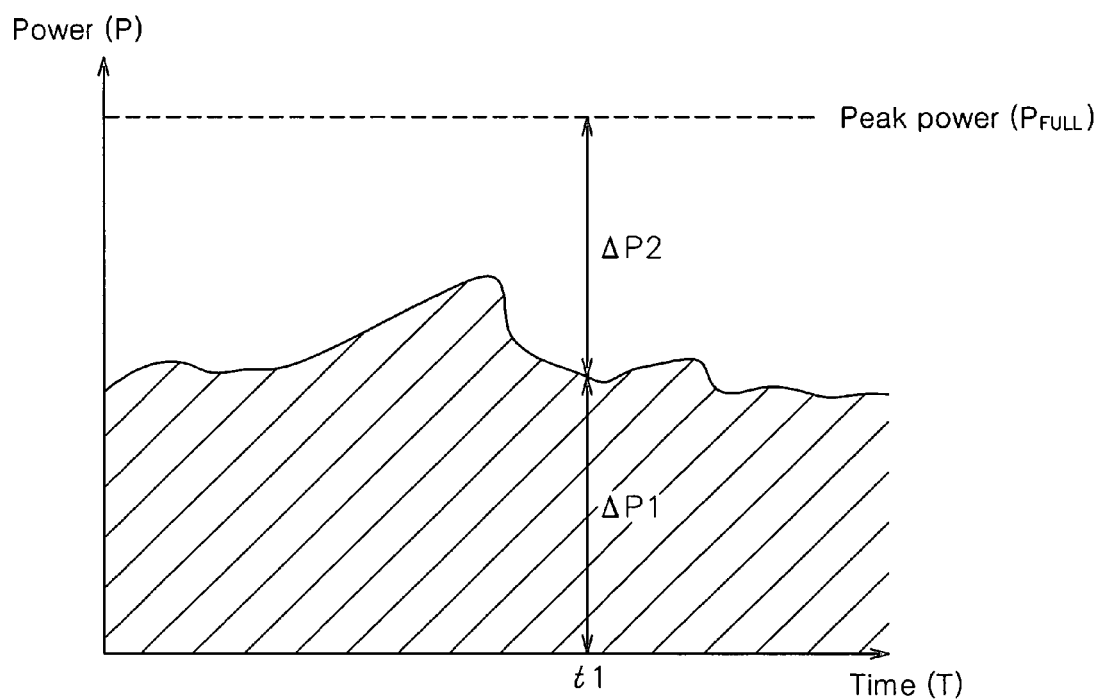
FIG. 1 is a graph for explaining power allocation in a conventional mobile communication system.

A preferred embodiment of the present invention will be described below in detail with reference to the accompanying drawings.

The invention provides an apparatus and method of power allocation for a packet data service in a mobile communication system, in which, in a situation where at least one voice call (line service) is in progress at a base transceiver station (BTS) with the use of the same frequency allocation (FA) but a packet data call is not yet present, when a new packet data call is generated, power can be allocated when packet data traffic generated by the new packet data call is transmitted.

The allocation of power is provided as follows.

When a unit of the minimum transmission time required to transmit traffic using the same power is called a slot, a magnitude of the slot (time unit) is an intrinsic set value of a system to be applied. For instance, this embodiment has the slot of 1.25 msec. In the embodiment according to the invention, it is assumed that, while the BTS provides a service only to at least one mobile station (MS) (also known as a power control terminal) which makes use of the line service, packet data traffic for the MS getting a packet data service is generated at a slot time t and then is transmitted at another slot time t+1. Here, the total power available for the MS getting the packet data service may be given as in Equation 1.

$$M_{RC}(t+1) = P_{Full} - P_{OH} - P_{PC}(t+1) \quad \text{Equation 1}$$

where, $P_{FULL}$: the peak power available at the BTS, $P_{OH}$: the power allocated to an overhead channel (control channel), $M_{RC}(t)$: the peak power available for MS getting the packet data service at the slot time t, $P_{PC}(t)$: the power allocated to MS getting the line service at the slot time t.

In the invention, the allocation of power is performed in such a manner that the total power, which is available at the MS getting the packet data service and is expressed by Equation 1, is gradually increased for a preset predetermined period of time, i.e., for n number of slots. The interval, which corresponds to n slots while the power allocation is gradually performed, is called a power increase interval.

The power increase interval n for gradually increasing power may be set in various ways, one of which is as follows.

When the power is allocated in such a way that power remaining in order to transmit new packet data traffic is allocated at one time, T (sec) refers to the time covering the range from a time point of transmitting packet data traffic for the first time to a time point at which transmission power for the MS making use of the line service reaches a stable state by means of transmission power control of the BTS, a value (the number of slots) dividing the time T by the magnitude of the slot is set to the power increase interval n for gradually increasing the power.

Hereinafter, description will be made regarding one example for calculating the power increase interval n according to the foregoing concept.

Generally, an S/N ratio, called a signal-to-noise ratio, can be defined as a value dividing the product of transmission power P and channel gain G by noise N, i.e., in a form of (P×G)/N. Here, the noise N includes the power supplied to the MS which make use of the packet data service as mentioned above.

Meanwhile, when the power control MS gets service from the BTS, as well as when the transmission power of the BTS is in the stable state, a signal-to-interference ratio (SIR) of the MS i can be represented as in the following Equation 2 (where the interference means a noise).

$$\frac{P_i(t)G_i(t)}{I_i(t) + \eta + [P_{PC}(t) + P_{OH} - P_i(t)]G_i(t)\delta} = \Gamma \quad \text{Equation 2}$$

where, G: the channel gain,

P: the transmission power,

I: the interference between cells, which acts on the MS i,

η: the thermal noise,

δ: the constant representing orthogonality, t: the slot time, i: the number of the specified MS.

In Equation 3, in the case where the packet data traffic is generated at the MS getting the packet data service at the slot time t and then is transmitted at the slot time t+1 in the state of Equation 2, SIRs of the MSs getting the line service have a value lower than that of a targeted SIR.

However, the power control is performed to the MSs making use of the line service where calls are in progress during an $n_i$ slot, and the SIR of the power control MS i returns to Γ, and thus the transmission power of the BTS is equal to the peak power, $P_{FULL}$.

$$\frac{P_i(t)\Delta^{n_i}G_i(t)}{I_i(t) + \eta + [P_{Full}(t) + P_i(t+n_i)]G_i(t+n_i)\delta} = \Gamma \quad \text{Equation 3}$$

Here, considering that the BTS continues to increase the transmission power of the MS i, $P_i(t+n_i)=P_i(t)\Delta^{n_i}$, $G_i(t+n_i)=G_i(t)$, $I_i(t+n_i)=I_i(t)$. Hence, Equation 3 can be expressed as the following Equation 4.

$$\frac{P_i(t)\Delta^{n_i}G_i(t)}{I_i(t) + \eta + [P_{PC}(t) - P_i(t)\Delta^{n_i}]G_i(t)\delta} = \Gamma \quad \text{Equation 4}$$

When $n_i$ is calculated from Equation 4, Equation 4 can be modified like Equation 5.

$$n_i = \log_\Delta \left[ 1 + \frac{\delta\Gamma}{1+\delta\Gamma} \cdot \frac{P_{Full} - P_{OH} - P_{PC}(t)}{P_i(t)} \right] \quad \text{Equation 5}$$

Where, i is the parameter indicating a particular mobile station.

With the use of Equation 5, $n_i$ values of all the MSs are obtained, so that the average of the values allows a value of n to be calculated as in Equation 6.

$$n \stackrel{def}{=} \lceil n_{avg} \rceil \quad \text{Equation 6}$$

where, n is the number of slots required until the power of the MS making use of the line service is restored to a normal state.

To put all the foregoing procedures together, the SIR of the MS i, i.e. $\Gamma$, must be always constantly maintained. As the power for transmitting the data packets is increased, the interference that the power control MS or the MS i gets is increased, so that $\Gamma$ is lowered. It is the number of slots, n, that is the time which it takes $\Gamma$ to be restored to its original state by means of the power control.

There are two methods for gradually allocating the power to the packet traffic during the time of n slots in accordance with the embodiment of the invention, one of which is for linearly allocating the power, so-called, a linear gradual power increase (LGPI), and the other for exponentially allocating the power, so-called, an exponential gradual power increase (EGPI). These two methods are shown as in FIG. 2, which will be described below.

Figure 2A:
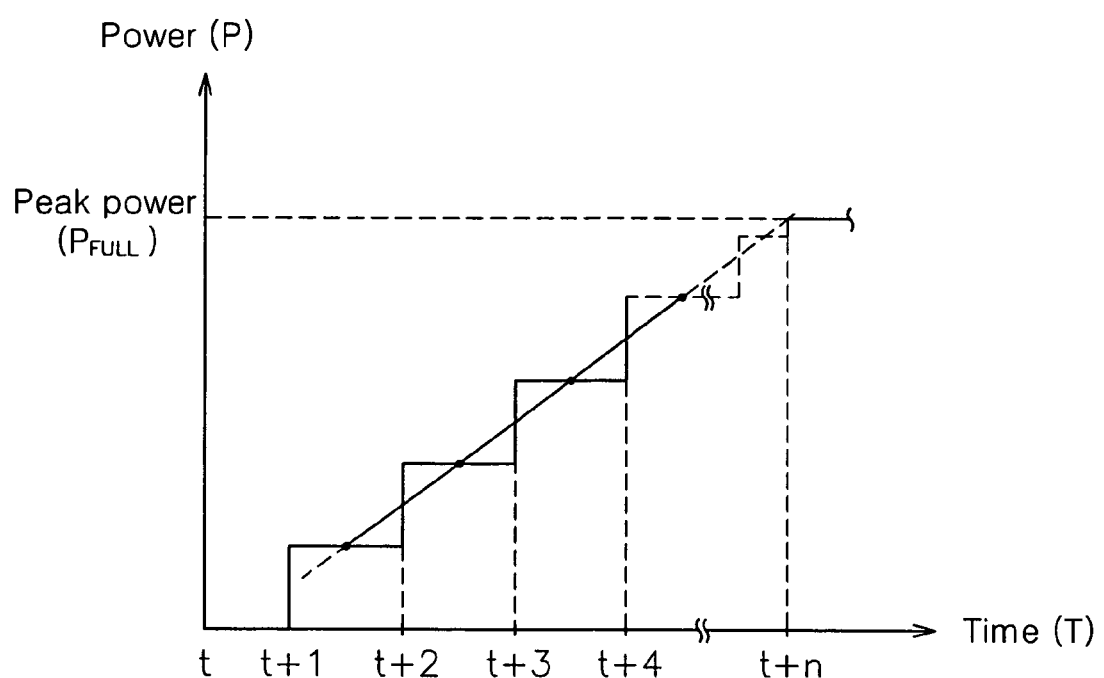
FIGS. 2a and 2b are schematic graphs explaining a power allocation method according to the invention.
Figure 2B:
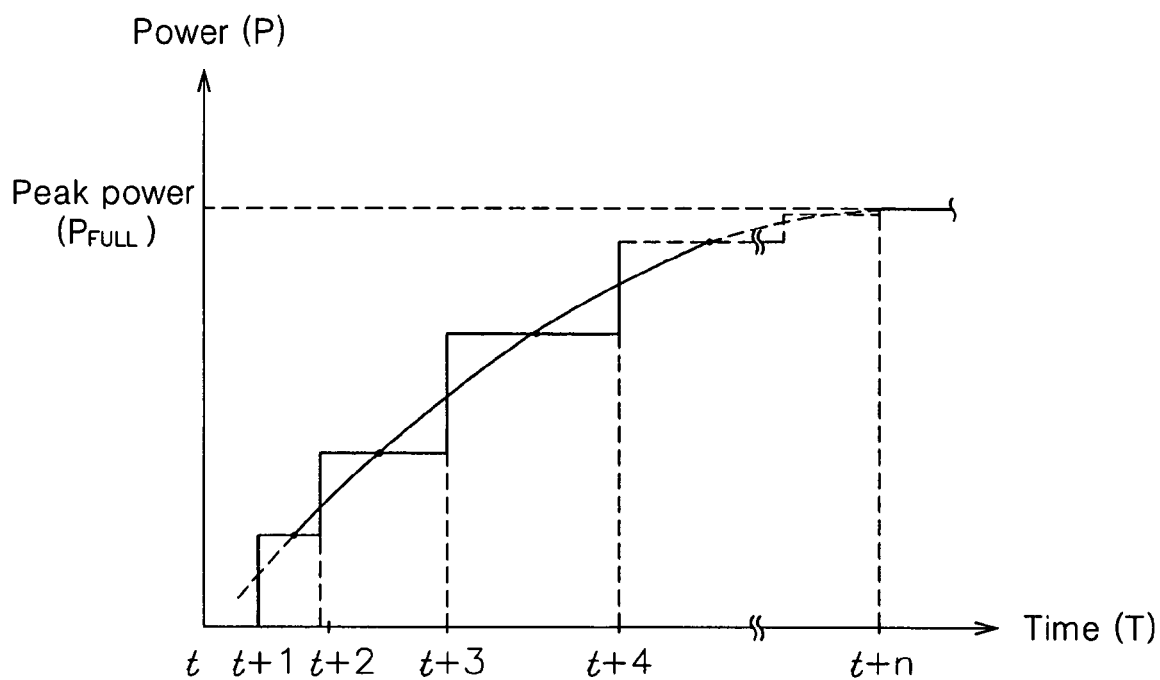

FIGS. 2a and 2b are graphs explaining a power allocation method according to the invention.

FIG. 2a shows the method for linearly allocating the power to the packet traffic during the time of n slots in which the power is allocated in such a manner that the power is gradually and uniformly increased at each slot time t, t+1, t+2, t+3, . . . , t+n.

FIG. 2b shows the method for exponentially allocating the power to the packet traffic during the time of n slots in which the power is allocated in such a manner that the power is gradually increased at each slot time t, t+1, t+2, t+3, . . . , t+n so as to converge at a constant value according to an exponential function.

As will be set forth below, a sudden power increase (SPI), as the conventional general power allocation method for allocating all the remaining power at once when the power is allocated, is exemplified for comparison with the LGPI and the EGPI, each of which is the power allocation method according to the invention.

The LGPI as well as the EGPI can be given as in Equation 7. The SPI is to represent a numerical formula according to the conventional power allocation method.

$$P_{RC}(t+k) = \begin{cases} SPI: M_{RC}(t+k) \\ LGPI: M_{RC}(t+k) \cdot \min\left[\frac{k}{n+1}, 1\right] \\ EGPI: M_{RC}(t+k) \cdot (1-q^k) \end{cases} \quad \text{Equation 7}$$

where, $M_{RC}(t)$: the peak power available for the MS getting the packet data service, $P_{RC}(t$ : the power allocated to the MS getting the packet data service, t: the current slot when the power control begins, n: the power increase interval (the number of slots), and the integer satisfying $n \geq 1$, k: the number of times of the slots by which the power increase is performed, and the integer satisfying $1 \leq k \leq n$, q: the time constant.

Here, if k is equal to n, q satisfies $\alpha = 1 - q^n$. In the embodiment, a value of q is used when $\alpha = 0.99$.

In the case where Equation 7 is applied to the LGPI such as the graph shown in FIG. 2a, as set forth above, the transmission power is expressed as follows:

for $k = 0$,  0 (null)

for $k = 1$,  $P_{RC}(t+1) = M_{RC}(t+1) \cdot \min\left[\frac{1}{n+1}, 1\right]$ for $k = 2$,  $P_{RC}(t+2) = M_{RC}(t+2) \cdot \min\left[\frac{2}{n+1}, 1\right]$ for $k = 3$,  $P_{RC}(t+3) = M_{RC}(t+3) \cdot \min\left[\frac{3}{n+1}, 1\right]$

...

for $k = n$   $P_{RC}(t+n) = M_{RC}(t+n) \cdot \min\left[\frac{n}{n+1}, 1\right]$ In other words, according to the above-mentioned formula, the power transmitted to the MS making use of the packet data service at each slot time t, t+1, t+2, t+3, . . . , t+n can be calculated.

Further, in the case where Equation 7 is applied to the EGPI, the power can be allocated like the graph shown in FIG. 2b.

Hereinafter, description will be made regarding a configuration for providing the packet data service of the mobile communication system according to the invention.

Figure 3:
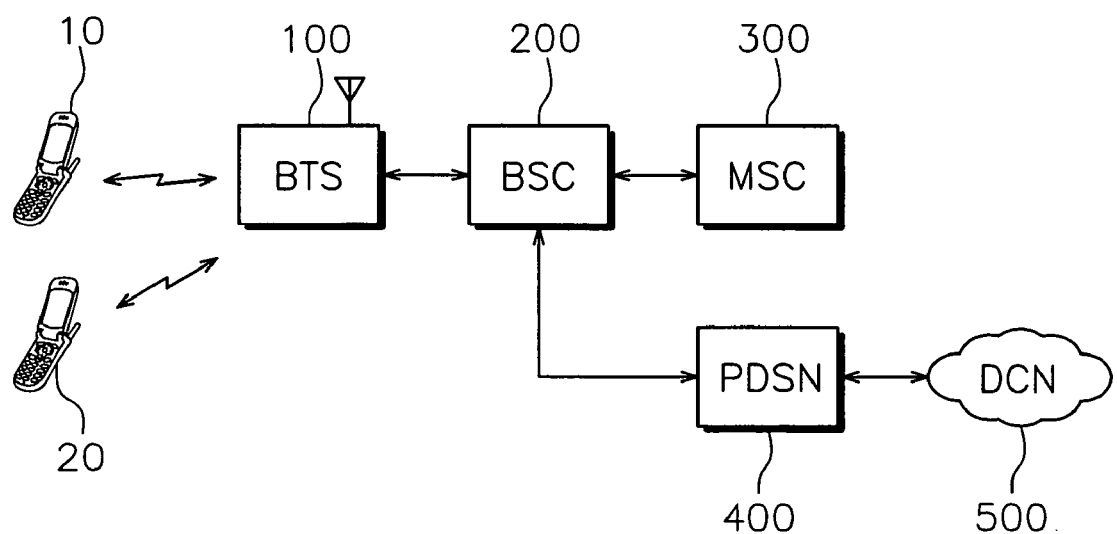
FIG. 3 is a schematic view for explaining a configuration of a mobile communication system to which the invention is applied.

FIG. 3 is a schematic view explaining the configuration of a mobile communication system to which the invention is applied.

Referring to FIG. 3, a mobile communication network according to the embodiment includes a base transceiver station (BTS) 100 for performing wireless communication with at least one mobile station (MS) 10, a base station controller (BSC) 200 connected to a mobile switching center (MSC) 300 and for controlling the BTS 100, and a packet data service node (PDSN) 400 connected to the BSC 200 to provide a packet data service and connected to a data core network (DCN) 500.

Figure 4:
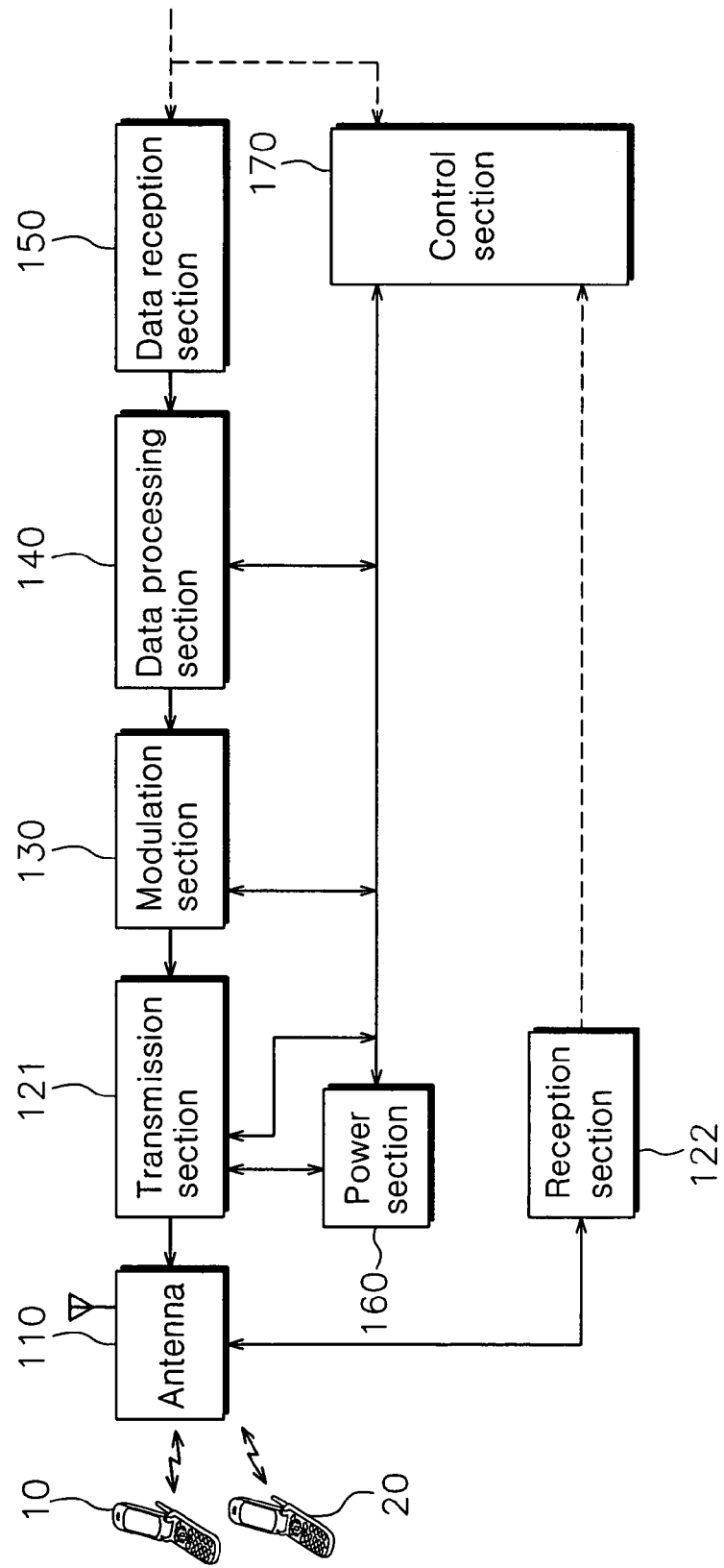
FIG. 4 is a block diagram explaining a configuration of a base transceiver station according to the invention.

A configuration of the BTS will be described below with reference to FIG. 4.

The BTS 100 according to the invention includes an antenna 110 for performing wireless communication with at least one MS 10, a transmission section 121 for performing wireless transmission by means of the antenna 110, a reception section 122 for performing wireless reception by means of the antenna 110, a data reception section 150 for receiving data to be transmitted from a mobile communication network to the MS 10, a data processing section 140 for processing the data received through the data reception section 150 in accordance with a predetermined algorithm, a modulation section 130 for modulating the data processed by the data processing section 140, a power section 160 for supplying/driving power to allow the transmission section 121 to transmit the data modulated by the modulation section 130 through the antenna 110, and a control section 170 for controlling the power section 160 to perform power allocation (e.g. EGPI or LGPI).

In the embodiment, the control section 170 is incorporated in the BTS 100, but it may be either built in the BSC 200 or provided as a separate device.

Figure 5:
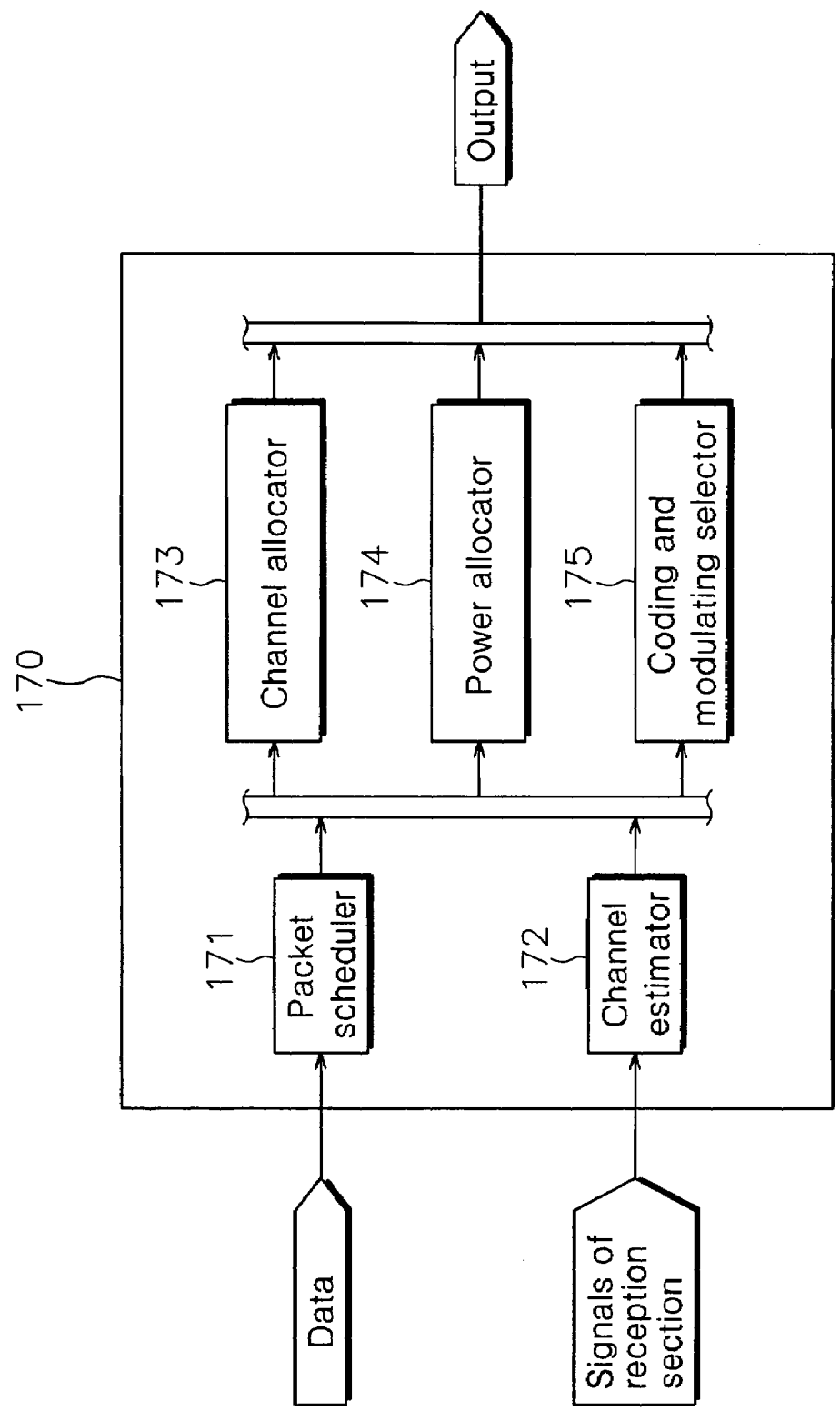
FIG. 5 is a block diagram explaining a configuration of a control section according to the invention.

FIG. 5 is a block diagram explaining a configuration of the control section according to the invention.

Referring to FIG. 5, the control section 170 includes a packet scheduler 171 for receiving data transmitted from a mobile communication network to perform packet scheduling, a channel estimator 172 for estimating channels according to signals received through the reception section 122, a channel allocator 173 for allocating communication channels, a power allocator 174 for controlling the power section 160 to allocate transmission power, and a coding and modulating selector 175 for performing coding and modulating of the data.

Subsequently, a procedure of allocating the power will be described.

Figure 6:
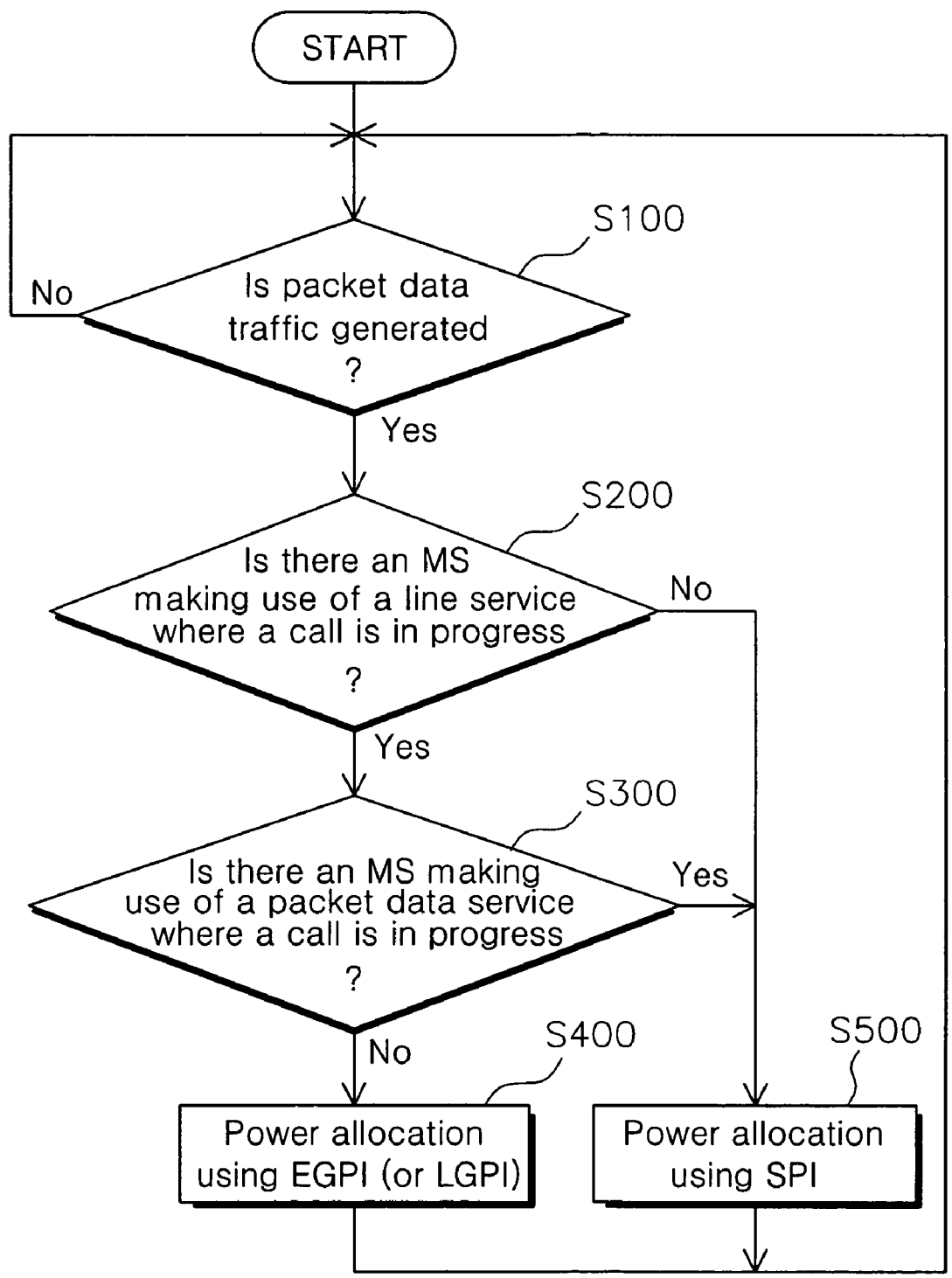
FIG. 6 is a flow chart explaining a power control method according to the invention.

FIG. 6 is a flow chart for explaining power allocation according to the invention.

Referring to FIG. 6, the control section 170 checks whether or not packet data traffic is generated (S100). As the checked result, if the packet data traffic is not generated in the step S100, the power allocation procedure is performed again from the start of the flow chart at the next slot.

However, as the checked result, if the packet data traffic is generated in the step S100, the control section 170 checks whether or not there is at least one MS making use of a line service (voice call) where a call is currently in progress (S200).

As the checked result, if there is no MS making use of the line service in the step S200, there is only the MS making use of the packet data service within a current cell, and thus the control section performs the power allocation to the MS making use of the packet data service with the use of the general power allocation method (SPI) (S500).

However, as the checked result, if there is any MS making use of the line service in the step S200, the control section determines whether or not packet data are transmitted at a current slot (S300).

If it is determined that the packet data are transmitted at the current slot in the step S300, that is, in the case where there has already been an MS making use of the packet data service within the cell, the control section performs the power allocation to the MS making use of the packet data service with the use of the general power allocation method (SPI) (S500).

However, if it is determined that the packet data is not transmitted at the current slot in the step S300, only voice calls of the MSs getting the line service are currently in progress within the cell, and thus the control section performs the power allocation to the MSs making use of the packet data service with the use of the EGPI or LPGI, the power allocation method according to the invention (S400). The power allocation method in the step S400 follows Equation 7.

According to the foregoing, in the case where only the voice calls of the MSs making use of the line service (voice call) are currently in progress within the cell, when new packet data traffic is generated, the step S400 is performed. As a result, the power allocation is performed in such a way that the power transmitted to the MS making use of the packet data service is linearly or exponentially increased step by step, so that it is possible to minimize outage information of the MS making use of the line service (voice call).

Simulation results of the system performance according to application of the invention are as follows.

The following are requirements for simulating the invention. The MSs are uniformly distributed in the omni-cell. Each MS moves at an average speed of 3 km/h with a standard deviation of 1 km/h. Further, each MS has a probability ratio of 30% to 70%, where 30% is the probability of changing a motion direction every five seconds and 70% is the probability of not doing so.

Here, the omni-cell is a hexagonal cell where each side is 300 meters. Seven cells are provided to have a wrapped around structure. The power control method for the voice call of the MSs which make use of the line service during a simulation follows a Radio Configuration 3 for CDMA2000-1X which is proposed by 3GPP2.

Furthermore, the number of MSs making use of the line service (voice call) is ten (10), and the number of MSs making use of the packet data service is variable, for example from 10 to 60. As the number of the MSs making use of the packet data service was increased, the resultant change was observed. As a main performance index, outage of the MSs making use of the line service (voice call) was used, where the outage was defined to be generated when reception Eb/No of the MS is below a reference value at each slot. For the simulation, the reference value was set to 5 dB.

Figure 7:
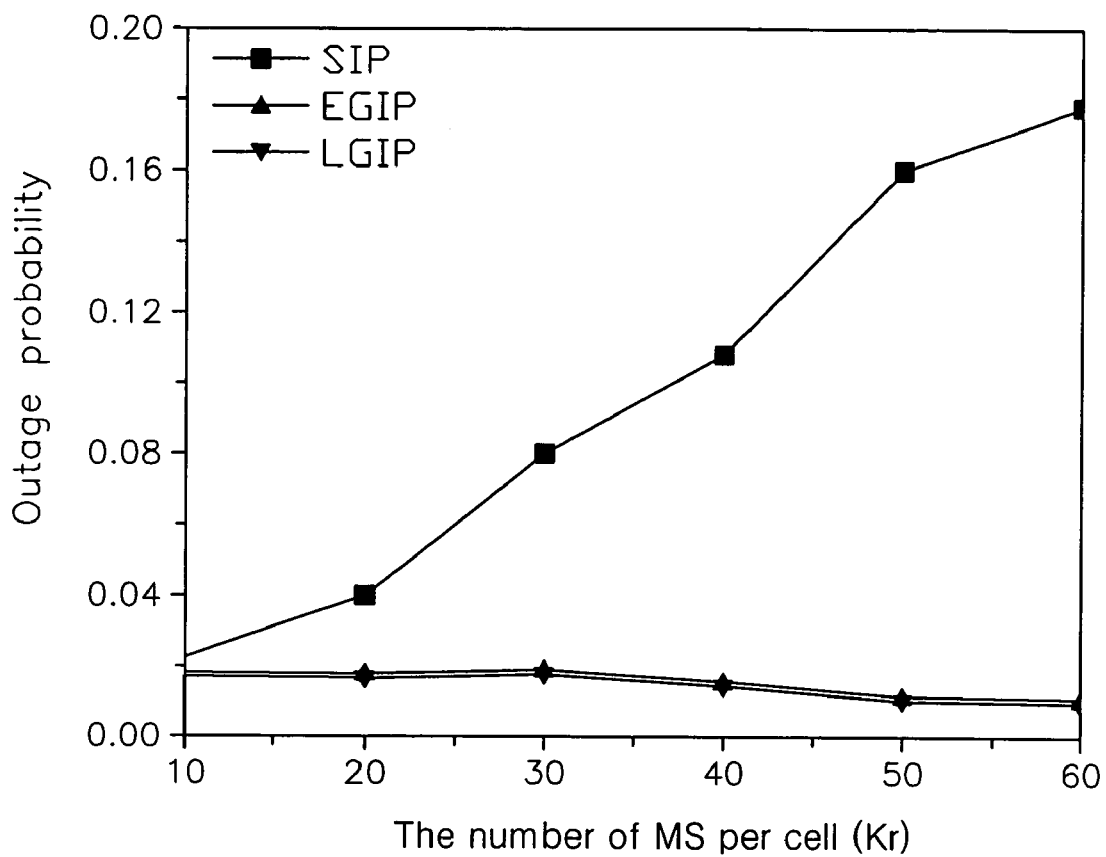
FIG. 7 is a graph explaining an effect according to the invention.

Referring to FIG. 7, it can be seen that an outage probability indicating outage information on the MSs making use of the line service is lowered as the number of MSs making use of the packet data service is increased more and more. Here, the power allocation method (EGPI or LGPI) according to the invention is remarkably low comparing with the conventional power allocation method (SPI).

As set forth in detail above, according to the invention of providing the apparatus and method of power allocation for the packet data service in mobile communication systems, by gradually increasing the power, which is transmitted to MSs making use of the packet data service at a preset period of time for a preset predetermined period of time, the line service and the packet data service can be simultaneously provided, and the outage of the MSs making use of the line service can be remarkably reduced compared with the conventional method.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A power allocation method of providing a packet data service with a line service in a mobile communication system having a base transceiver station (BTS) for performing wireless communication with a plurality of mobile stations (MSs), the method comprising the steps of:
   (a) determining whether or not packet data traffic is generated for a first MS among said plurality of MSs;
   (b) if it is determined in step (a) that the packet data traffic is generated for the first MS, determining whether or not there is a second MS among said plurality of MSs that is currently using the line service with a call being in progress;
   (c) if it is determined in step (b) that the second MS is currently using the line service with the call being in progress, determining whether or not there is packet data being transmitted during a current time slot; and
   (d) if it is determined that the packet data traffic is generated for the first MS when there is no packet data being transmitted during the current time slot, gradually increasing, at each slot time during a period of time, power allocated to the first MS for providing the packet data service to the first MS;
   wherein said method further comprises the step of calculating said period of time which is required for a signalto-interference ratio (SIR) of the second MS to be restored to a SIR target value when power allocated to the second MS is changed due to the packet data service, wherein said period of time is calculated from (i) the SIR target value, (ii) peak power of the BTS currently available for the packet data service, and (iii) the power currently allocated to the second MS during the current time slot, and wherein the power allocated to the first MS in step (d) is gradually increased toward said peak power currently available for the packet data service.

2. The power allocation method as claimed in claim 1, wherein the packet data traffic in the step (a) is generated when the mobile station performs packet data communication including at least one of a wireless application protocol (WAP), a file transfer protocol (FTP) and a hypertext transfer protocol (HTTP).

3. The power allocation method as claimed in claim 1, further comprising the step of, if it is determined in step (b) that there is no MS currently using the line service, allocating the entire peak power currently available for the packet data service to the first MS.

4. The power allocation method as claimed in claim 3, wherein the entire peak power currently available for the packet data service is allocated to the first MS at once.

5. The power allocation method as claimed in claim 1, further comprising the step of, if it is determined in the step (c) that there is packet data being transmitted during the current time slot while the second MS is currently using the line service with the call being in progress, allocating the entire peak power currently available for the packet data service to the first MS.

6. The power allocation method as claimed in claim 5, wherein the entire peak power currently available for the packet data service is allocated to the first MS at once.

7. The power allocation method as claimed in claim 1, wherein in step (d) the power allocated to the first MS is linearly increased by a same preset power magnitude at each said slot time.

8. The power allocation method as claimed in claim 7, wherein in step (d) the power allocated to the first MS is gradually increased up to the peak power currently available for the packet data service.

9. The power allocation method as claimed in claim 1, wherein in step (d) the power allocated to the first MS is non-linearly increased during said period of time.

10. The power allocation method as claimed in claim 9, wherein in step (d) the power allocated to the first MS is gradually increased up to the peak power currently available for the packet data service.

11. The power allocation method as claimed in claim 1, wherein a number n of the time slots in the period of time is calculated as follows:

$$n_i = \log_\Delta \left[ 1 + \frac{\delta\Gamma}{1+\delta\Gamma} \cdot \frac{P_{Full} - P_{OH} - P_{PC}(t)}{P_i(t)} \right]$$

$$n \stackrel{def}{=} \lceil n_{avg} \rceil$$

where
i is the index indicating a particular MS,
$\Delta$ is the constant representing orthogonality,
$\Gamma$ is the SIR target value,
$P_{FuLL}$ is the peak power available at the BTS,
$P_{OH}$ is the power allocated to an overhead channel,
$P_{pc}(t)$ is the power allocated to the line service at the current slot time t,
$P_i(t)$ is the power allocated to the $i^{th}$ MS at the current slot time t, and
$n_{avg}$ is the average of all values $n_i$ of all MSs.

12. A power allocation apparatus for providing a packet data service with a line service over a mobile communication network in a mobile communication system having a base transceiver station (BTS) for performing wireless communication with a plurality of mobile stations (MSs), and a base station controller (BSC) connected to a mobile switching center (MSC) and for controlling the BTS, the BTS comprising
an antenna for performing wireless communication with the MSs;
a transmission section coupled to the antenna for performing wireless transmission by means of the antenna;
a reception section coupled to the antenna for performing wireless reception by means of the antenna;
a data reception section for receiving data to be transmitted from the mobile communication network to the MSs;
a data processing section coupled to the data reception section for processing the data received though the data reception section in accordance with a predetermined algorithm;
a modulation section coupled to the data processing section and the transmission section for modulating the data processed by the data processing section; and
a power section coupled to the transmission section for supplying driving power to the transmission section to allow the data modulated by the modulation section to be transmitted by the transmission section through the antenna;

said power allocation apparatus comprising a control section for
(a) determining whether or not packet data traffic is generated for a first MS among said plurality of MSs;
(b) if it is determined at (a) that the packet data traffic is generated for the first MS, determining whether or not there is a second MS among said plurality of MSs that is currently using the line service with a call being in progress;
(c) if it is determined at (b) that the second MS is currently using the line service with the call being in progress, determining whether or not there is packet data being transmitted during a current time slot; and
(d) if it is determined that the packet data traffic is generated for the first MS when there is no packet data being transmitted during the current time slot, controlling the power section to gradually increase, at each slot time during a period of time, power allocated to the first MS for providing the packet data service to the first MS;

wherein said control section is further configured for calculating said period of time which is required for a signal-to-interference ratio (SIR) of the second MS to be restored to a SIR target value when power allocated to the second MS is changed due to the packet data service, wherein said period of time is calculated from (i) the SIR target value, (ii) peak power of the BTS currently available for the packet data service, and (iii) the power currently allocated to the second MS during the current time slot, and wherein said control section is further configured for controlling the power section to gradually increase the power allocated to the first MS at (d) toward said peak power currently available for the packet data service.

13. The power allocation apparatus as claimed in claim 12, wherein the control section resides in the BTS and is coupled to at least said power section.

14. The power allocation apparatus as claimed in claim 12, wherein the control section resides in the BSC.

15. The power allocation apparatus as claimed in claim 12, wherein the control section comprises:
- a packet scheduler for receiving data transmitted from the mobile communication network to perform packet scheduling;
- a channel estimator for estimating channels according to signals received through the reception section;
- a channel allocator for allocating communication channels;
- a power allocator for controlling the power section to allocate transmission power; and
- a coding and modulating selector for performing coding and modulating of the data.

16. The power allocation apparatus as claimed in claim 12, wherein the control section controls the power section to (e) allocate the entire peak power currently available for the packet data service to the first MS if it is determined at (b) that there is no MS currently using the line service.

17. The power allocation apparatus as claimed in claim 16, wherein the control section controls the power section to (f) allocate the entire peak power currently available for the packet data service to the first MS if it is determined at (c) that there is packet data being transmitted during the current time slot while the second MS is currently using the line service with the call being in progress.

18. The power allocation apparatus as claimed in claim 16 claim 17, wherein the control section controls the power section to allocate at (e) the entire peak power currently available for the packet data service to the first MS. at once.

19. The power allocation apparatus as claimed in claim 18, wherein the control section controls the power section to allocate at (f) the entire peak power currently available for the packet data service to the first MS at once.

20. The power allocation apparatus as claimed in claim 12, wherein the control section controls the power section at (d) to gradually non-linearly increase the power allocated to the first MS during the period of time.

21. The power allocation apparatus as claimed in claim 20, wherein the control section controls the power section at (d) to gradually exponentially increase the power allocated to the first MS during the period of time.

22. The power allocation apparatus as claimed in claim 12, wherein the control section controls the power section at (d) to cause the gradually increasing power allocated to the first MS to be increased up to the peak power currently available for the packet data service.

* * * * *